Figure 1:
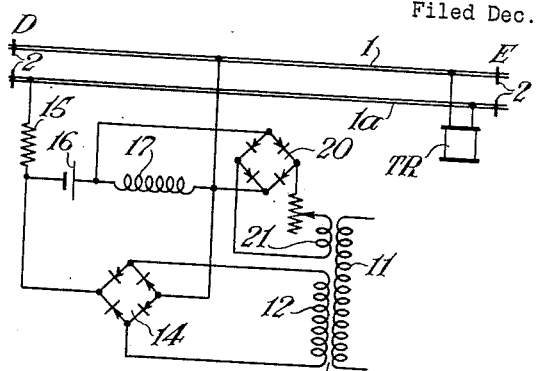

INVENTOR
Conrad H. Zierdt
BY
HIS ATTORNEY

Patented Nov. 23, 1943

2,335,167

UNITED STATES PATENT OFFICE 2,335,167

RECTIFYING APPARATUS

Conrad H. Zierdt, Rosedale, Pa., assignor to The Union Switch & Signal Company, Swissvale, Pa., a corporation of Pennsylvania Application December 4, 1942, Serial No. 467,863

12 Claims. (Cl. 175—363)

My invention relates to rectifying apparatus, and has particular reference to the organization of such apparatus into rectifying systems of the class involving a direct current load, a main source of supply for the load comprising a source of alternating current and a rectifier, and an auxiliary or stand-by source of power for the load comprising a primary or a secondary battery.

In a rectifying system of the class described where a primary battery is employed as a stand-by source, the apparatus is usually arranged and adjusted so that when the alternating current source is effective, the rectifier supplies the major portion of the load and only a slight discharge is taken from the battery. In such a system, the voltage of the battery at low loads is relatively high (being of the order of 0.9 volt per cell) and to insure that only a slight discharge will be drawn from the battery it is necessary to adjust the output voltage of the rectifier to a value substantially that of the voltage of the primary battery at low loads. If, now, the alternating current source fails and the primary battery supplies the entire load, the voltage of the battery decreases to a relatively low value of the order of 0.65 volt per cell, with a corresponding decrease in current supplied to the load. A corresponding condition exists in rectifying systems wherein storage batteries are employed as stand-by sources and are normally maintained on charge. In these latter systems the drop in voltage that obtains when the alternating current source fails is due to the combination of the removal of the charging current and the application of the load.

The drop in voltage and current that occurs when the load is transferred to the stand-by source, is often objectionable if the load is normally operating near minimum limits of voltage and current. An example of such a load is a railway track circuit.

In view of the foregoing and other important considerations, it is an object of my present invention to provide novel and improved rectifying systems of the class described.

Another object of my invention is to provide rectifying systems of the class described incorporating novel and improved means for preventing variations in voltage when the load is shifted from the main source of rectified alternating current to the auxiliary source of battery power.

In practicing the invention, the above-mentioned and other important objects and characteristic features of my invention which will become readily apparent from the following description are attained by adjusting the voltage of the main source of rectified alternating current to the voltage of the battery under full load and by creating across a voltage consuming device, connected in series with the battery, a voltage drop in opposition to the battery voltage and having a value selected to reduce the battery voltage effective at a load from its value at low loads to its value under full load. The opposing voltage drop is derived from the main source of alternating current so as to be effective only when that source is effective.

I shall describe several forms of apparatus embodying my invention, and shall then point out the novel features thereof in claims.

In the accompanying drawing, Fig. 1 is a diagrammatic view illustrating one form of apparatus embodying my invention. Figs. 2, 3, 4, 5 and 6 are each diagrammatic views showing modified forms of the apparatus represented in Fig. 1 and also embodying my invention. In each of the several views, similar reference characters have been employed to designate corresponding parts.

Referring first to Fig. 1, the reference characters 1 and 1a designate the track rails of a stretch of railway track divided by insulated joints 2 into a track section D—E. The section is provided with a track circuit which includes a direct current relay TR connected across the rails adjacent to section end E and this track circuit is an example of a direct current load of the class wherein the voltage and current supplied thereto is usually adjusted relatively close to the minimum operating limits in order to obtain proper operation of the load. Located at the other end of section D—E is a transformer 10 having a primary winding 11 connected with a suitable source of alternating current, such as a generator not shown. A secondary winding 12 of transformer 10 is connected with the input terminals of a full wave main rectifier 14 and the output terminals of this rectifier are connected across the rails 1 and 1a adjacent to section end D through a current limiting resistor 15. A battery 16 and a reactor 17 are connected in series across the output terminals of the main rectifier 14 in multiple with resistor 15 and the track circuit. This rectifying system as thus far described corresponds to the system shown and covered in Letters Patent of the United States No. 1,804,663 granted to me on May 12, 1931.

In accordance with my present invention, the parts of the rectifying system just described are adjusted to cause rectifiers 14 to apply to the load a voltage which substantially corresponds to the terminal voltage of battery 16 when it is under full load, and the system is provided with novel and improved means effective when the source of alternating current is active, for creating in reactor 17 a voltage drop in opposition to the battery voltage and having a value such that the battery voltage effective at the load is reduced from its value at low loads to its value under full load. This is achieved by passing current through the reactor from an auxiliary rectifier supplied from the source of alternating current, the direction of the current from the auxiliary rectifier in the reactor being in agreement with the current supplied from the battery when it supplies the load and hence the arrangement is equivalent to opposing the battery voltage with another voltage having a value sufficient to secure the desired resultant voltage at the load. These means, as shown in Fig. 1, comprise a full wave control rectifier 20 having its input terminals connected with a secondary winding 21 on transformer 10 and having its output terminals connected across reactor 17 and poled to supply current to the reactor in agreement with the supply of current thereto from battery 16. The parts are so proportioned that rectifier 20 establishes across reactor 17 a voltage drop that substantially corresponds to the difference between the respective voltages of battery 16 at low loads and at full load. For example, if the battery is of the storage battery type wherein the fully charged (gassing) voltage is of the order of 2.50 volts per cell and the voltage under load (with charging current removed) is of the order of 2.15 volts per cell, then rectifier 14 will be adjusted to apply to the load a voltage of substantially 2.15 volts for each cell of the battery and rectifier 20 will be adjusted to create in reactor 17 a voltage drop just slightly more than the difference (0.35 volt per cell) between the fully charged and the loaded voltage of the storage cell. In this case the voltage drop in reactor 17 lowers the battery voltage at the track circuit to a value slightly less than its value at full load and also slightly less than the value of the rectified alternating current voltage so that battery 16 is maintained on a slight charge. If, now, the alternating current source fails and battery 16 is relied upon to supply the load until the alternating current source is restored, the voltage drop created in reactor 17 by rectifier 20 and the charging current are of course absent and the voltage applied to the load remains substantially constant since the application of the load to the battery automatically results in lowering its terminal voltage from its relatively high no-load value to the lower value at which the main rectifier is adjusted.

Similarly, should battery 16 be of the primary type wherein the voltage under low loads is of the order of 0.9 volt per cell and the terminal voltage under full loads is of the order of 0.65 volt per cell, rectifier 14 will be adjusted to apply to the load a voltage just slightly less than the voltage of the battery at full loads, i. e., 0.65 volt for each cell of the primary battery, and rectifier 20 will be adjusted to create in reactor 17 a voltage drop having a value substantially equal to the difference between the respective voltages of battery 16 at low and full loads i. e., substantially 0.25 volt per cell of the battery. In such a case, the voltage drop created in reactor 17 by rectifier 20 lowers the battery voltage effective at the track circuit to its value at full load and only a slight discharge will be drawn from the battery. It follows, therefore, that when the alternating current source fails and battery 16 is relied upon to supply the load until the alternating current source is restored, the voltage drop created in reactor 17 by rectifier 20 is of course absent and the voltage applied to the load remains substantially the same since the application of the load to the battery automatically results in lowering its terminal voltage from its relatively high value at low loads to the lower value at which the main rectifier is adjusted.

Figure 2:
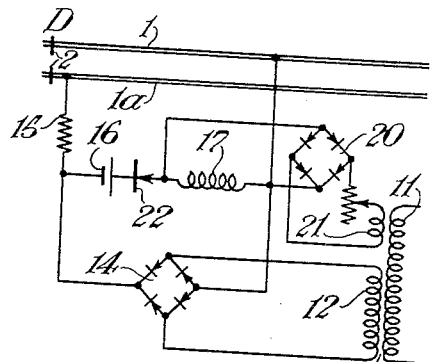

In cases where a primary type battery is employed, it is desirable to provide means for positively preventing that battery from being charged and Fig. 2 represents the apparatus of Fig. 1 modified to incorporate an asymmetrical unit 22 in series with battery 16 and reactor 17 and poled to prevent a current flow through the battery in its reverse direction, thereby to prevent rectifier 14 or rectifier 20 from forcing current through the battery in its reverse direction and so insuring against charging battery 16.

Figure 3:
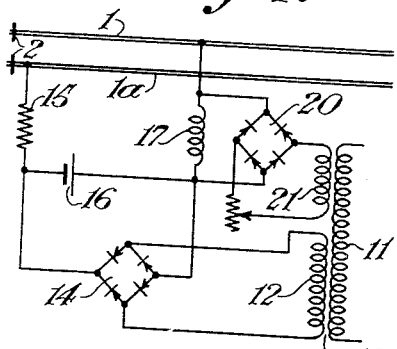

Another modification of the apparatus of Fig. 1, is represented is Fig. 3 wherein reactor 17 is connected in series with the load and hence in circuit with both battery 16 and rectifier 14 so that the voltage of rectifier 20 applied across the reactor creates a voltage drop which opposes both the battery and main rectifier voltages. This scheme is particularly useful with storage batteries because the voltage of rectifier 14 may be adjusted to the gassing voltage of battery 16 to insure that the battery will always be fully charged, while the voltage drop created in reactor 17 by rectifier 20 of course lowers both the battery and rectifier 14 voltages effective at the load to the full load value of the voltage of battery 16 so that if the alternating current source fails, the charging current and the voltage drop created in reactor 17 by rectifier 20 will be removed and as a result the voltage applied to the load will remain substantially the same when battery 16 supplies the entire load as when the load is supplied from rectifier 14.

Figure 4:
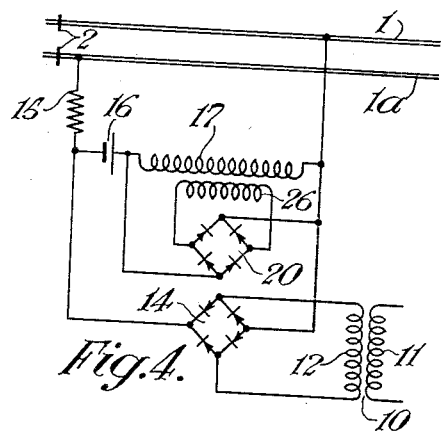

Fig. 4 represents another modification of the structure of Fig. 1 wherein the voltage drop created in reactor 17 is derived from the reactor by connecting the input terminals of rectifier 20 to secondary winding 26 inductively coupled with the reactor. The ripples in the direct current applied by rectifier 14 to battery 16 through reactor 17 induce an alternating current voltage in winding 26 and this voltage when rectified and impressed on reactor 17 functions in the same manner as the voltage impressed by rectifier 20 on reactor 17 of Fig. 1.

Figure 5:
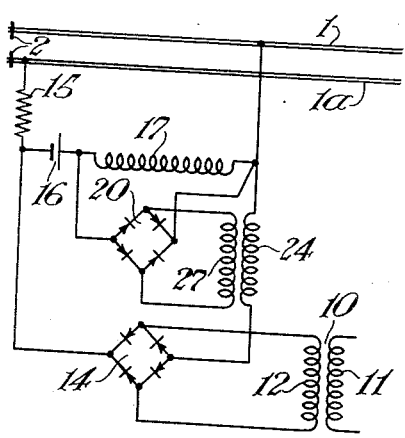

Fig. 5 represents still another modifiction of the structure of Fig. 1 wherein secondary winding 27 is inductively coupled with a primary winding 24 interposed in the load circuit between rectifier 14 and the load. As in Fig. 4, the ripples in the direct current applied from the rectifier to the load in Fig. 5 cause an alternating current to be induced in winding 27 and this voltage when rectified by rectifier 20 and impressed on reactor 17 creates a voltage drop which opposes the battery voltage to reduce the effective voltage at the load to that of the battery under full load.

Figure 6:
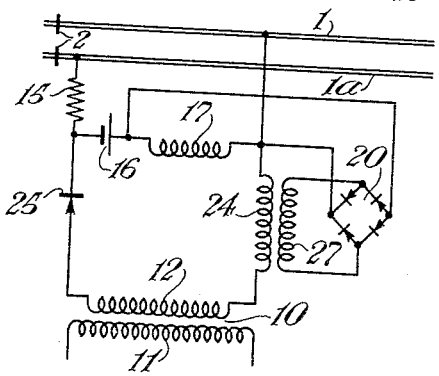

In Fig. 6, secondary winding 12 of transformer 10 is connected to the load through a half-wave rectifier 25, while secondary winding 27 is inductively coupled with primary winding 24 interposed in the connection of winding 12 to the load.

In this arrangement, the half-wave pulses of current supplied through rectifier 25 to the load are effective to induce an alternating current voltage in winding 27 and this voltage when rectified by rectifier 20 and applied across reactor 17 functions in substantially the same manner as the voltage impressed by rectifier 20 on reactor 17 in Fig. 1.

From the foregoing, it is readily apparent that I have provided novel and improved rectifying systems for impressing substantially the same voltage upon a direct current load regardless of whether the load is supplied from a main source of alternating current or from an auxiliary battery when the main source fails.

Although I have herein shown and described only a few forms of rectifying systems embodying my invention, it is understood that various changes and modifications may be made therein within the scope of the appended claims without departing from the spirit and scope of my invention.

Having thus described my invention, what I claim is:

1. In combination with a source of alternating current connected with a direct current load through a rectifier and having a battery and a reactor connected in series with said load and in multiple with said rectifier, a second rectifier, means for supplying energy derived from said alternating current source to said second rectifier, and means for connecting said second rectifier across said reactor with said second rectifier poled to create in said reactor a voltage drop in opposition to the voltage of said battery.

2. In a rectifying system comprising a transformer having a primary winding connected with a source of alternating current and a secondary winding connected through a rectifier to a direct current load and including a battery and an impedance connected in series with said load and in multiple with said rectifier, the combination of a second secondary winding for said transformer, a second rectifier having its input terminals connected across said second secondary winding, and a circuit for connecting the output terminals of said second rectifier across said impedance with said second rectifier poled to create in said impedance a voltage drop in opposition to the battery voltage.

3. In a rectifying system of the class comprising a transformer having its primary winding connected with a source of alternating current and its secondary winding connected with the input terminals of a full-wave rectifier which in turn has its output terminals connected with a direct current load and also has a battery and a reactor connected in series across the rectifier output terminals and in multiple with the load with the battery poled to supply current to said load in agreement with the current from said rectifier, the combination of a second secondary winding for said transformer, and a second rectifier having its input terminals connected across said second secondary winding and its output terminals connected across said reactor to create therein a voltage drop in opposition to the voltage of said battery.

4. In a rectifying system comprising a transformer having its primary winding connected with a source of alternating current and its secondary winding connected with a direct current load through a main rectifier, a battery connected across said load in multiple with said main rectifier, a reactor connected in series with said battery and said main rectifier, a control rectifier, means for supplying energy derived from said alternating current source to said control rectifier, and means for connecting said control rectifier across said reactor to create therein a voltage drop in opposition to the voltage of said battery.

5. In combination with a source of alternating current connected with a direct current load through a rectifier and having a battery and a reactor connected in series with said load and in multiple with said rectifier, an asymmetrical unit connected in series with said battery and reactor and poled in agreement with the supply of current from said battery, a second rectifier, means for supplying energy derived from said alternating current source to said second rectifier, and means for connecting said second rectifier across said reactor to create in said reactor a voltage drop in opposition to the voltage of said battery.

6. In combination with a source of alternating current and a direct current load including a reactor, a battery connected across said load, a rectifier having its input terminals connected with said source and its output terminals connected across said load in multiple with said battery, said rectifier and battery poled to supply current in agreement to said load, and a second rectifier having its input terminals connected with said source and its output terminals connected across said reactor to create therein a voltage drop in opposition to the voltages of said first rectifier and battery.

7. In combination with a direct current load including an impedance, a battery connected across said load, a transformer having a primary winding connected with a source of alternating current, a rectifier having its input terminals connected with a secondary winding of said transformer and having its output terminals connected with said load in multiple with said battery with said rectifier poled to supply current to said load in agreement with said battery, and a second rectifier having its input terminals connected with a second secondary winding of said transformer and its output terminals connected across said impedance with said second rectifier poled to create in the reactor a voltage drop in opposition to the voltage of said battery.

8. In combination with a direct current load, a source of alternating current connected with said load through a first rectifier, a battery and a reactor connected in series with said load and in multiple with said first rectifier with said battery and first rectifier poled to supply current in agreement to said load, and a second rectifier having its input terminals inductively coupled with said reactor and having its output terminals connected across said reactor and poled to creat in said reactor a voltage drop in opposition to the voltage of said battery.

9. In combination with a direct current load, a source of alternating current connected with said load through a circuit including a first rectifier and a winding, a battery and a reactor connected in series with said load and in multiple with said first rectifier and winding with said battery and first rectifier poled to supply current in agreement to said load, and a second rectifier having its input terminals inductively coupled with said winding and having its output terminals connected across said reactor with said second rectifier poled to create therein a voltage drop in opposition to the voltage of said battery.

10. In combination with a direct current load, a transformer having a primary winding connected with a source of alternating current and a secondary winding connected with said load through a circuit including an asymmetrical unit and an induction winding, a battery and a reactor connected in series with said load and in multiple with said asymmetrical unit and induction winding, said battery and asymmetrical unit being poled to supply current in agreement to said load, and a rectifier having its input terminals inductively coupled with said induction winding and having its output terminals connected across said reactor with said rectifier poled to create therein a voltage drop in opposition to the voltage of said battery.

11. In a rectifying system for applying substantially the same voltage to a direct current load from either a main source of rectified alternating current or an auxiliary source of battery power, the combination with a direct current load, a source of alternating current, a rectifier connecting said source with said load, a battery and an impedance connected in series with said load and in multiple with said rectifier, said rectifier and battery poled to supply current in agreement to said load, and means deriving energy from said source of alternating current for creating in said reactor a voltage drop in opposition to the voltage of said battery and having a value sufficient to limit the voltage of said battery effective at said load to a value substantially that of the battery under full load.

12. In a rectifying system for applying substantially the same voltage to a direct current load from either a main source of rectified alternating current or an auxiliary source of battery power, the combination with a direct current load, a source of alternating current, a rectifier connecting said source with said load, a battery and an impedance connected in series with said load and in multiple with said rectifier, said rectifier and battery poled to supply current in agreement to said load, and a second rectifier having its input terminals connected with said alternating current source and its output terminals connected across said reactor for creating in said reactor a voltage drop in opposition to the voltage of said battery and having a value sufficient to lower the voltage of said battery effective at said load to a value substantially that of the battery under full load.

CONRAD H. ZIERDT.